United States Patent [19]

Sin

[11] Patent Number: 5,216,564
[45] Date of Patent: Jun. 1, 1993

[54] REEL LOCKING DEVICE OF VIDEO TAPE CASSETTE

[75] Inventor: Sang K. Sin, Seoul, Rep. of Korea

[73] Assignee: SKC Limited, Kyongki, Rep. of Korea

[21] Appl. No.: 732,046

[22] Filed: Jul. 18, 1991

[30] Foreign Application Priority Data

Jul. 24, 1990 [KR] Rep. of Korea ............ 90-10880

[51] Int. Cl.⁵ .................................. G11B 23/087
[52] U.S. Cl. .................................. 360/132
[58] Field of Search ............ 360/132; 242/198, 199

[56] References Cited

U.S. PATENT DOCUMENTS 4,513,928  4/1985  Hackett ............................ 360/132
4,607,307  8/1986  Sieben ............................. 360/132

*Primary Examiner*—Robert S. Tupper
*Attorney, Agent, or Firm*—Quarles & Brady

[57] ABSTRACT

The present invention relates to improving a reel locking device which locks or releases a supply reel 2 and a take-up reel 2' while entering and leaving the teeth 4,4' formed in the circumference of the reel downs 3,3' of said supply and take-up reels installed in the inside of video tape cassette 1. In such a reel locking device, wings 12, 12' with locking jaws 13, 13' formed at the front ends are extended on both sides of the upper end of plate-shaped body 11 and a hinge axis 14 is formed at the lower end thereof and, in the lower part of said hinge axis 14, a elastic piece 15 whose lower end bends upward is formed and both ends of said axis 14 are united with hinge grooves 7, 7' formed in the lower side of the lock guide 6 of half down 5 so as to correspond to the curved elastic piece 15.

2 Claims, 3 Drawing Sheets

REEL LOCKING DEVICE OF VIDEO TAPE CASSETTE

BACKGROUND OF THE INVENTION

1. Field of the Invention

The present invention relates to a reel locking device of video tape cassette and particularly to a reel locking device which reduces the number of parts, retrenches its cost price and facilitates its assembly work by integrating the supply reel locker, take-up reel locker, release lever and elastic spring which are heretofore in use.

2. Brief Description of the Prior Art

Generally, the reel locking device in a usual video tape cassette comprises two lockers which lock a supply reel and a take-up reel respectively, a common release lever which releases the locked reels and a spring which is so elastic as to effect smooth locking and releasing. In ordinary times, the locking device locks the reels so that the tape may not be unfastened. When the cassette is safely seated on the deck, the locking device releases the locked reels.

These prior locking mechanism are disclosed, by way of example, in U.S. Pat. Nos. 4,106,724 and 4,232,840.

In the conventional locking device, rockers 53, 53' where locking pieces 51, 51' and pressed pieces 52, 52' making a fixed angle therewith are formed in the axial direction of cylindrical bodies 50, 50' are supported by springs 56, 56' so that those extended pieces may come into contact with the presser 55 bottom of release lever 54 by being separated from each other, as illustrated in FIG. 5.

Therefore, said conventional locking device has no particular problem in fulfilling its function as a locking device. However, it involves some problems. As it comprises two lockers 53, 53', a reel release lever 54 and tow springs 56, 56', these parts must be manufactured by separate injection molding and their manufacturing cost rises accordingly. As many parts must be assembled into a locking device, its process of assembly is complicated and assembly work efficiency is thereby lowered. Moreover, troubles are frequent due to complicated makeup.

BRIEF DESCRIPTION OF THE PRESENT INVENTION

In order to solve such problems as described above, the present invention aims at providing a reel locking device of video tape cassette improved so as to curtail manufacturing cost and promote work efficiency by integrating the existing supply reel locker, take-up reel locker, release lever and elastic springs to reduce the number of parts.

Now, the present invention will be described in detail by referring to the drawings attached hereto.

DETAILED DESCRIPTION OF THE PREFERRED EMBODIMENTS

Figure 1:
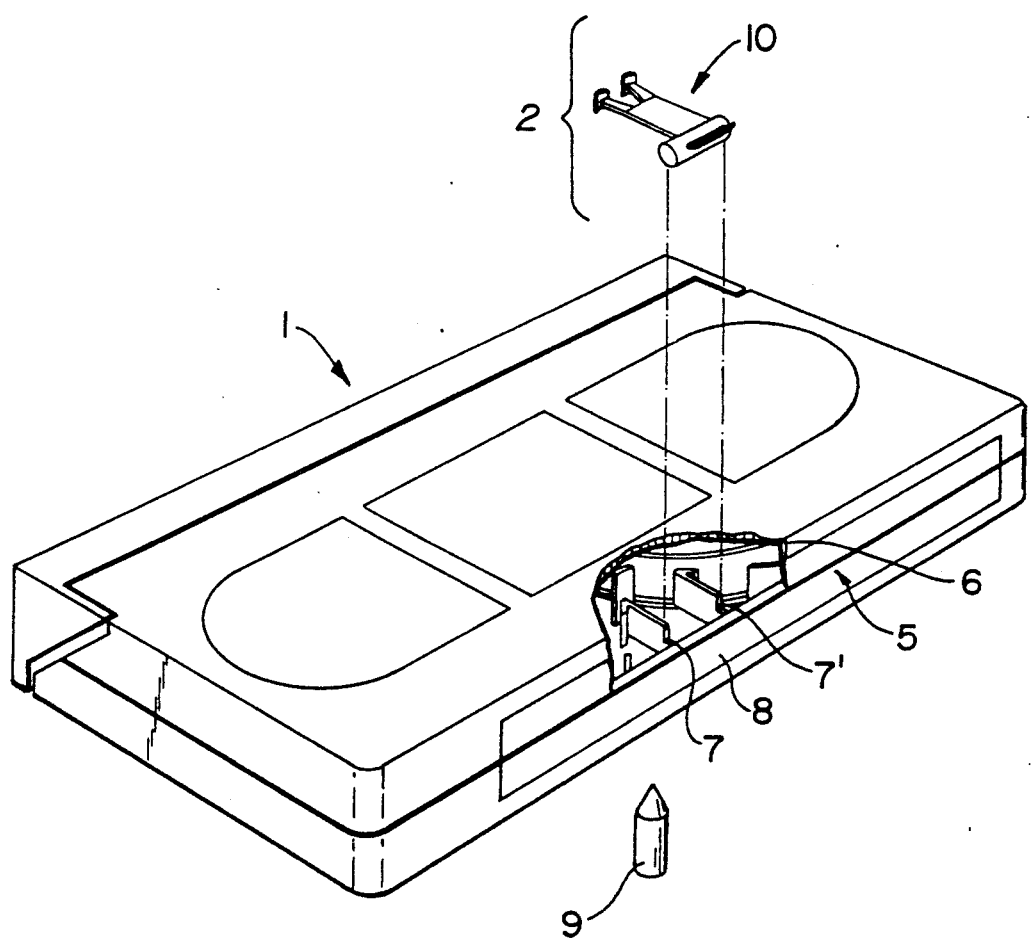
FIG. 1 is a perspective view showing that the important part of the present invention is disassembled.
Figure 2:
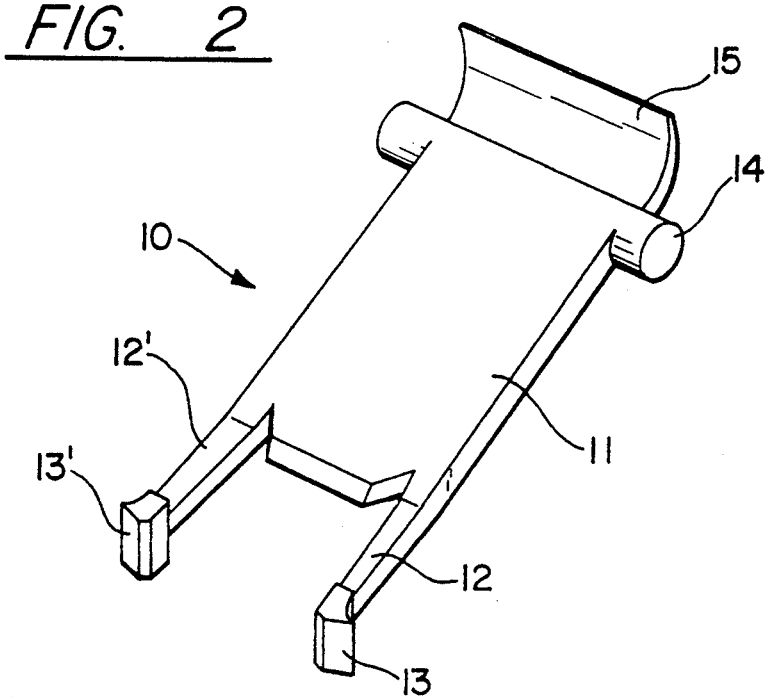
FIG. 2 is a perspective view showing an enlarged view of a port bracketed 2 in FIG. 1.
Figure 3:
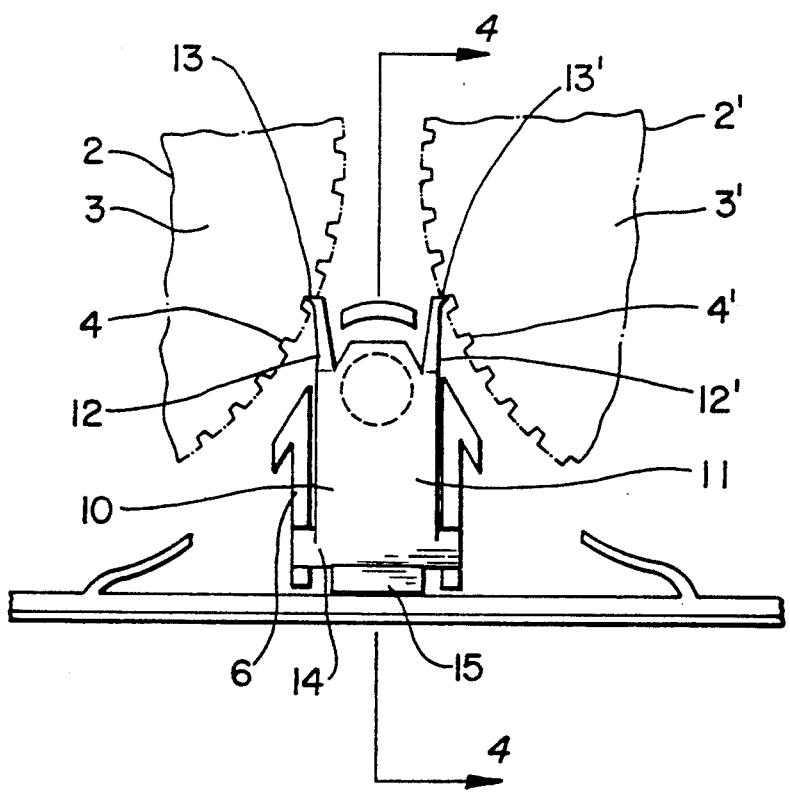
FIG. 3 is a plane view showing that the present invention is assembled.

In the locking device which locks a supply reel 2 and a take-up reel 2' or release them while entering and leaving the teeth 4, 4' formed in the circumference of the reel downs 3, 3' of said supply and take-up reels 2, 2' installed in the inside of video tape cassette 1, a reel locker 10 applicable thereto is formed but wings 12, 12' with locking jaws 13, 13' formed at the front ends are extended on both side of the upper end of plate-shaped locker 11 and a hinge member 14 is formed at the lower end thereof and, in the lower part of hinge member 14, a elastic piece 15 whose lower end bends upward is formed and both ends of said hinge member 14 are united with hinge grooves 7, 7' formed in the lower side of the lock guide 6 of half down 5 so as to correspond to the elastic piece 15.

In the drawing, the unexplained mark 8 is a rear side wall and mark 9 is a release case.

Referring now to a process of assembling the present invention, it can be easily assembled if a reel locker 10 wherein locking jaws 13, 13' which lock both reels 2, 2' or release them and the body 11 which serves as a known release lever and an elastic piece which serves as an elastic spring are formed as one body is united with the central part of lock guide 6 provided in the half down 5 so that both ends of hinge member 14 and hinge grooves 7, 7' may face each other.

When the reel locker is assembled in this way, the elastic piece 15 formed in the lower part of hinge member 14 is elastically supported in the inner surface of the rear wall 8 of half down. In such a condition, both wings 12, 12' at the upper end of reel locker 10 are closely attached by the elastic force of elastic piece 15 and then the locking jaws 13, 13' are inserted into the grooves 4, 4' formed in the reel downs 3, 3' of both reels 2, 2' and both reels 2, 2' are thereby kept locked.

Figure 4:
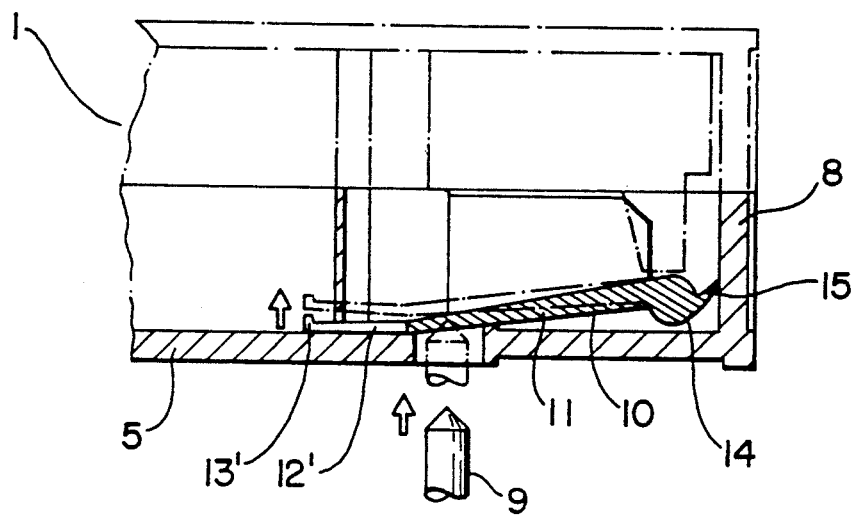
FIG. 4 is a sectional view taken along the line 4—4 of FIG. 3.
Figure 5:
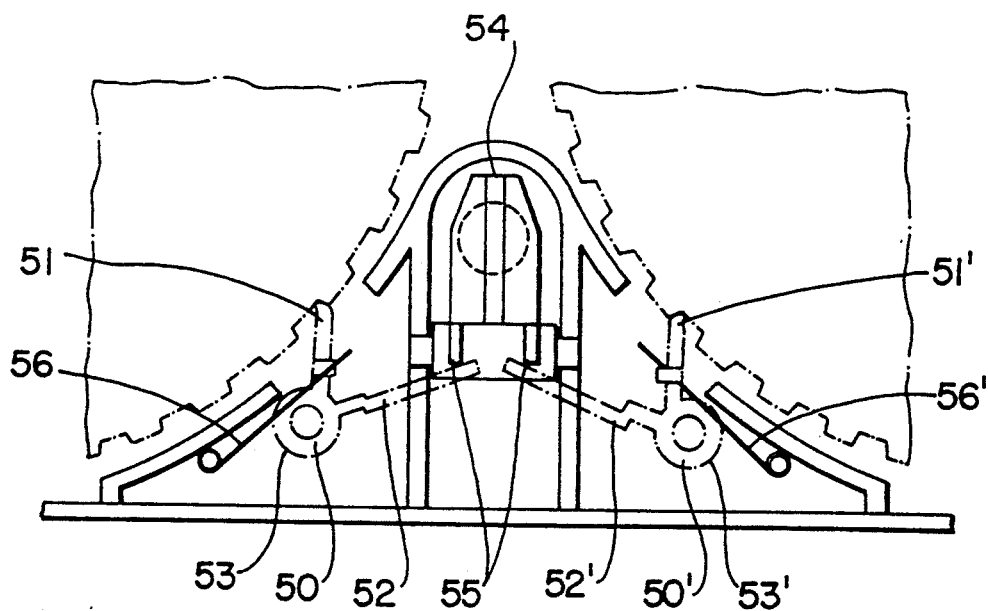
FIG. 5 is a plane view of the conventional reel locking device.

Looking now at the working of the reel locker in an assembled condition, it is as follows:

When the video tape cassette is safely seated on the deck, the release case 9 pushes the body 11 of reel locked 10 upward by being inserted through a release hole 9 like a supposed line in FIG. 4.

Then, the reel locker 10 separates from the teeth 4, 4' of reel downs 3, 3' with its upper end being lifted and aocked reels 2, 2' are thereby released.

When locked reels are released in this way, the locking jaws 13, 13' formed at the front ends of wings 12, 12' are lifted to the upper ends of the grooves 4, 4' of reel downs 3, 3' and the elastic piece 15 accumulates its elastic force.

In contrast with this, when the video tape cassette 1 is drawn from the deck, the force which was pushing the body 11 of reel locker 10 upward is released and the reel locker 10 returns to its initial state by the elastic force of elastic piece 15 and the locking jaws 13, 13' lock both reels 2,2' by being inserted into the teeth 4, 4' of reel downs 3, 3'.

As heretofore described, the present invention is a useful invention by reason that parts are simplified and manufacturing cost is curtailed and assembly work is improved by integrating a locker release lever and an elastic spring into one reel locker and parts control is thereby made easy.

I claim:

1. A reel locking device which locks or releases a supply reel and a take-up reel of a video tape cassette by being inserted into or separated from grooves formed in the circumference of reel flanges of the supply reel and the take-up reel installed inside of a shell of the video tape cassette, said locking device comprising:
   a locker body;
   locking jaws extending from said locker body for removably locking engagement with the flange grooves;
   a hinge member formed on said locker body for pivotally mounting said locker body to the video tape cassette shell such that said jaws can be pivoted about an axis of said hinge member into engagement with grooves and out of engagement with the grooves out of a plane defined by the flanges; and
   an elastic tab integrally formed with the hinge member and locker body for engaging a portion of the video tape cassette shell so as to bias the jaws into engagement with the flange grooves.

2. The locking device according to claim 1, wherein the locker body is plate-shaped and the jaws are formed at the end of wings extending in the same direction from opposite lateral edges of the locker body.

* * * * *